United States Patent
Trundle

(10) Patent No.: US 10,826,814 B1
(45) Date of Patent: Nov. 3, 2020

(54) DYNAMIC AVAILABILITY-BASED WIRELESS DATA TRANSMISSION

(71) Applicant: Alarm.com Incorporated, Tysons, VA (US)

(72) Inventor: Stephen Scott Trundle, Falls Church, VA (US)

(73) Assignee: Alarm.com Incorporated, Tysons, VA (US)

( * ) Notice: Subject to any disclaimer, the term of this patent is extended or adjusted under 35 U.S.C. 154(b) by 0 days.

(21) Appl. No.: 16/266,532

(22) Filed: Feb. 4, 2019

Related U.S. Application Data

(63) Continuation of application No. 15/282,695, filed on Sep. 30, 2016, now Pat. No. 10,200,272.

(60) Provisional application No. 62/235,053, filed on Sep. 30, 2015.

(51) Int. Cl.
  *H04L 29/06* (2006.01)
  *H04L 29/08* (2006.01)
  *H04L 12/26* (2006.01)

(52) U.S. Cl.
  CPC .......... *H04L 43/50* (2013.01); *H04L 43/0805* (2013.01); *H04L 43/0852* (2013.01)

(58) Field of Classification Search
  CPC  H04L 43/0805; H04L 43/0852; G06F 9/4408
  USPC .................. 709/204, 219, 223, 224, 250
  See application file for complete search history.

(56) References Cited

U.S. PATENT DOCUMENTS

| | | | |
|---|---|---|---|
| 7,647,037 B2 | 1/2010 | Ayachitula | |
| 8,779,919 B1 * | 7/2014 | Darling | G08B 27/00 340/539.16 |
| 9,141,276 B2 * | 9/2015 | Dawes | G06F 3/0488 |
| 2002/0077786 A1 | 6/2002 | Vogel | |
| 2009/0046739 A1 | 2/2009 | Ebling | |

(Continued)

OTHER PUBLICATIONS

"IoT Based Smart Security and Home Automation System"—Kodali et al, Department of Electronic and Communication Engineering, National Institute of TechnologyApr. 2016 https://www.researchgate.net/profile/Ravi_Kodali/publication/312559421_IoT_based_smart_security_and_home_automation_system.pdfYear:2016 (Year: 2016).*

(Continued)

*Primary Examiner* — Randy A Scott
(74) *Attorney, Agent, or Firm* — Fish & Richardson P.C.

(57) ABSTRACT

In some implementations, a system can be used to selectively transmit bandwidth-intensive data over a cellular network based on dynamically determining resource availability over the cellular network. Monitoring system data to be transmitted to a remote server can initially be obtained by a component of a monitoring system. One or more network performance tests may be performed on a carrier network associated with the monitoring system. One or more network performance parameters can be computed based on results of the one or more network performance tests. The one or more network performance parameters can then be evaluated in relation to transmission requirements associated with the monitoring system data. A particular transmission strategy to use in transmitting the monitoring system data to the remote server can then be selected from among multiple transmission strategies. The monitoring system data is then transmitted to the server in accordance with the particular transmission strategy.

20 Claims, 7 Drawing Sheets

(56) References Cited

U.S. PATENT DOCUMENTS

| | | | |
|---|---|---|---|
| 2009/0075648 A1 | 3/2009 | Reed | |
| 2010/0318641 A1* | 12/2010 | Bullard | H04L 43/065 709/223 |
| 2013/0343207 A1* | 12/2013 | Cook | H04L 43/0852 370/252 |
| 2015/0288619 A1* | 10/2015 | Fritsch | H04L 41/5025 709/224 |
| 2016/0058287 A1* | 3/2016 | Dyell | A61B 5/002 340/870.07 |

OTHER PUBLICATIONS

"Downlink Scheduling with Transmission Strategy Selection for Multi-Cell MIMO Systems" Niu et al, IEEE Transactions on Wireless Communications, vol. 12, No. 2, Retrieved from: https://ieeexplore.ieee.org/starnp/starnp.jsp?arnumber=6397548, dated Feb. 2013.

\* cited by examiner

600

| | TRANSMISSION REQUIREMENTS (610) | CARRIER NETWORK PERFORMANCE (620) | TRANSMISSION STRATEGY (630) |
|---|---|---|---|
| 635 | - LIFE CRITICAL URGENCY (ALARM SIGNAL DATA)<br>- LOW SIZE (ALARM SIGNAL DATA) | - | IMMEDIATELY TRANSFER DATA OVER CARRIER NETWORK REGARDLESS OF CARRIER NETWORK PERFORMANCE |
| 640 | - HIGH URGENCY (SECURITY DATA)<br>- MEDIUM URGENCY (HVAC DATA)<br>- LARGE SIZE (SECURITY DATA)<br>- LARGE SIZE (HVAC DATA) | - LOW NETWORK COST<br>- LOW NETWORK LATENCY | IMMEDIATELY TRANSFER SECURITY DATA OVER CARRIER NETWORK<br>(DELAY TRANSMISSION OF HVAC DATA) |
| 645 | - MEDIUM URGENCY (ALL DATA)<br>- LARGE SIZE (ALL DATA) | - HIGH NETWORK COST<br>- LOW NETWORK LATENCY | DELAY ALL DATA TRANSMISSION UNTIL COST OF TRANSMISSION IS LOWER |
| 650 | - LOW URGENCY (ALL DATA)<br>- MEDIUM SIZE (ALL DATA) | - LOW NETWORK COST<br>- HIGH NETWORK LATENCY | DELAY ALL DATA TRANSMISSION UNTIL LATENCY OF NETWORK LATENCY IMPROVES (STORE IN TEMPORARY CACHE) |
| 655 | - MEDIUM URGENCY (ALL DATA)<br>- SMALL SIZE (ALL DATA) | - AVERAGE NETWORK COST<br>- HIGH NETWORK LATENCY | DELAY ALL DATA TRANSMISSION FOR THREE HOURS |
| 660 | - MEDIUM URGENCY (SECURITY DATA)<br>- LARGE SIZE (SECURITY DATA) | - HIGH NETWORK COST<br>- AVERAGE NETWORK LATENCY | REDUCE FILE SIZE OF SECURITY DATA TO BE TRANSMITTED |

FIG. 6

DYNAMIC AVAILABILITY-BASED WIRELESS DATA TRANSMISSION

CROSS-REFERENCE TO RELATED APPLICATION

This application is a continuation of U.S. application Ser. No. 15/282,695, filed Sep. 30, 2016, which claims the benefit of U.S. Provisional Application No. 62/235,053, filed Sep. 30, 2015, and titled "Dynamic Availability-Based Wireless Data Transmission." Both of these prior applications are incorporated by reference in their entirety.

TECHNICAL FIELD

This disclosure relates to wireless technology.

BACKGROUND

Wireless data transmission systems utilize an internet connection in transferring data between local clients and remote servers. For example, home security systems utilize internet connections provided by an internet service provider to upload bandwidth-intensive data such as security footage, which may lead to excessive Internet usage.

SUMMARY

Techniques are described for transmitting bandwidth-intensive data. For example, techniques are described to transmit bandwidth-intensive data over a cellular network based on dynamically determining resource availability over the cellular network using a network profile that indicates network availability. The network profile may be generated based on a local or remote database that stores network characteristics that indicate network availability over the cellular network. Implementations of the described techniques may include hardware, a method or process implemented at least partially in hardware, or a computer-readable storage medium encoded with executable instructions that, when executed by a processor, perform operations.

The details of one or more implementations are set forth in the accompanying drawings and the description below. Other features will be apparent from the description and drawings.

DESCRIPTION OF DRAWINGS

FIG. 6 illustrates an example of transmission strategies within a repository.

DETAILED DESCRIPTION

In some implementations, a current status associated with a carrier network may be determined based on performing a set of network tests on the carrier network. The carrier network may be determined to be robust based on the current status associated with the carrier network. A threshold latency for data to be transmitted over the carrier network may be calculated based on the current status associated with the carrier network. The latency for data to be transmitted may be compared to the threshold latency and if the latency for the data is below the threshold latency, a signal to transmit the data over the carrier network may be generated and transmitted over a local network.

Figure 1:
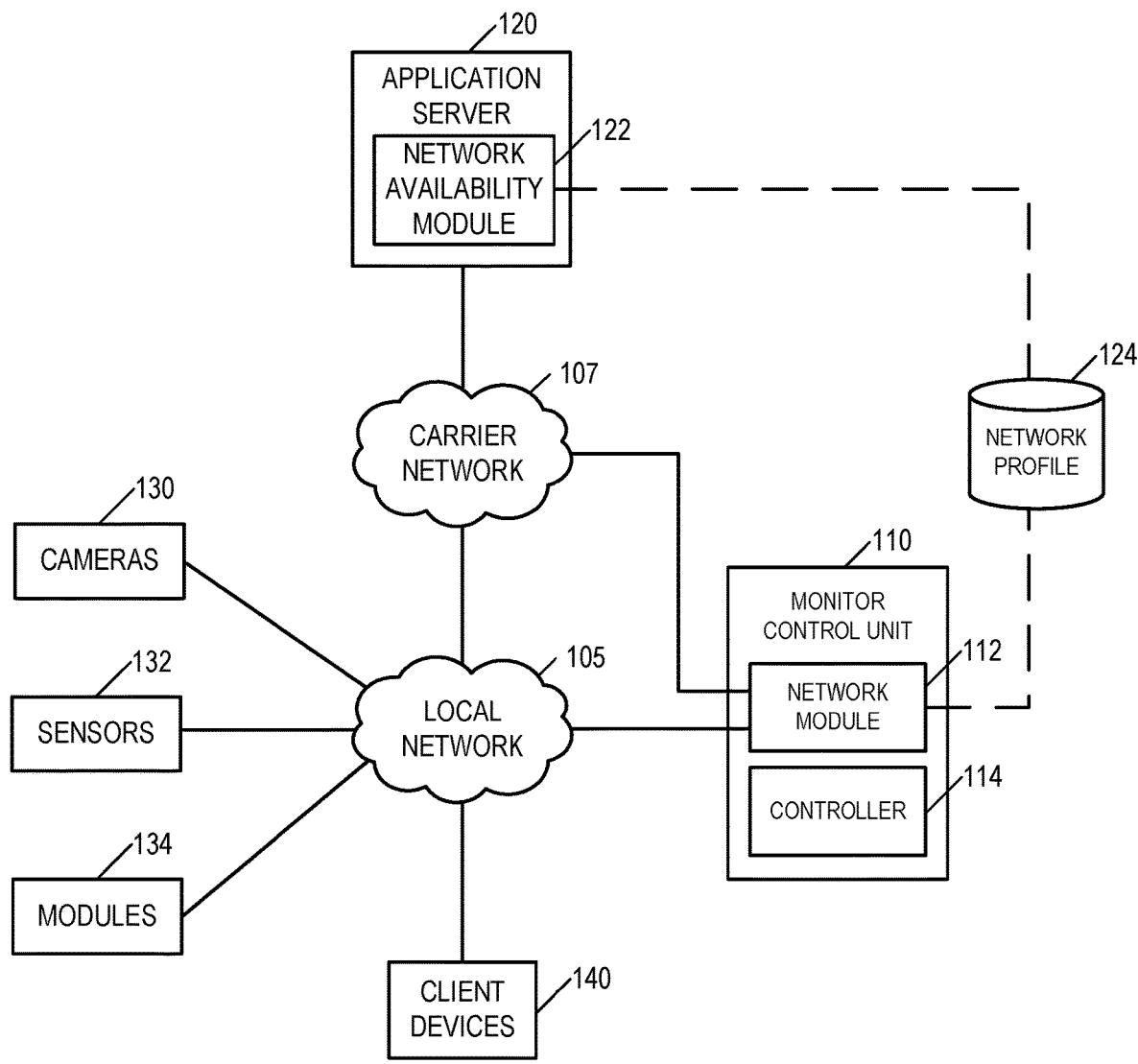
FIG. 1 illustrates an example system.

FIG. 1 illustrates an example of a system 100 that may be configured to monitor a property and monitor activity over a network used to transmit data collected in monitoring the property. The system 100 may include a local network 105, a carrier network 107, a monitor control unit 110, an application server 120, cameras 130, sensors 132, modules 134, and client devices 140.

The local network 105 may be configured to enable electronic communications between devices connected to the local network 105. For example, the local network 105 may be configured to enable exchange of electronic communications between the carrier network 107, the monitor control unit 110, the cameras 130, the sensors 132, the modules 134, and the client devices 140. The local network 105 may include Local Area Networks (LANs), Wi-Fi, or analog or digital wired and wireless networks. The local network 105 may include multiple networks or subnetworks, each of which may include, for example, a wired or wireless data pathway. The local network 105 may also include a circuit-switched network, a packet-switched data network, or any other network able to carry electronic communications (e.g., data or voice communications). For example, the local network 105 may include networks based on the Internet protocol (IP), or other comparable technologies.

The carrier network 107 may be configured to enable electronic communications between the monitor control unit 110 and the application server 120 without the use of the local network 105. For instance, the carrier network 107 may be a proprietary network infrastructure operated by a carrier server of a telecommunications service provider. In some examples, the carrier network 107 may include wide area networks (WAN) of computers that receive services provided by the telecommunications service provider.

The monitor control unit 110 may include a controller 112 and a network module 114. The controller 112 may be configured to control a monitoring system, such as a security system associated with a property that includes the monitor control unit 110. In some examples, the controller 112 may include a processor or other control circuitry configured to execute instructions of a program that controls operation of a security system. In these examples, the controller 112 may be configured to receive input from sensors, detectors, or other devices associated with the security system and control operation of components of the security system, such as a camera, a motion sensor, an alarm detector, an appliance, lights, etc. For example, the controller 112 may be configured to control operation of the network module 114 included in the monitor control unit 110.

The network module 114 may be a communication device configured to exchange communications over the local network 105 and the carrier network 107. The network module 114 may be a wireless communication module configured to exchange wireless communications over the local network 105. For example, the network module 114 may be a wireless communication device configured to exchange communications over a short-range wireless network.

The network module 114 also may be configured to exchange communications over the carrier network 107 using a wireless connection. For instance, the network module 114 may enable the monitor control unit 110 to exchange communications with the application server 120 over the carrier network 107 without the use of the local network 105. In such instances, transmissions over the carrier network 107 may be performed without impacting the local network 105. The wireless communication device may include one or more GSM modules, a radio modem, a cellular transmission module, or any type of module configured to exchange communications in one of the following formats: LTE, GSM or GPRS, CDMA, EDGE or EGPRS, EV-DO or EVDO, UMTS, IP, or Wi-Fi.

The network module 114 also may be a wired communication module configured to exchange communications over the local network 105 using a wired connection. For instance, the network module 114 may be a modem, a network interface card, or another type of network interface device. The network module 114 may be an Ethernet network card configured to enable the monitor control unit 110 to communicate over a local area network and/or the Internet. The network module 114 also may be a voice band modem configured to enable the alarm panel to communicate over the telephone lines of Plain Old Telephone Systems (POTS). In some implementations, the alarm panel may be a broadband or cellular gateway where the network module 114 may enable the monitor control unit 110 to communicate over the local network 105 and the carrier network 107.

The monitor control unit 110 may communicate with the application server 120, the cameras 130, the sensors 132, the modules 134, and the client devices 140 to wirelessly transmit data generated from the cameras 130 and the client devices 140 over the carrier network 107. For instance, the monitor control unit 110 may monitor the data generated by the cameras 130 and the client devices 140 based on exchanging communications with the cameras 130 and the client devices 140 over the local network 105. In some examples, the monitor control unit 110 may receive data activity reports from the cameras 130 and the client devices 140 that indicate information about the data generated by the cameras 130 and the client devices 140. In response to receiving the data activity reports, the monitor control unit 110 may transmit the data activity reports to the application server 120 over the carrier network 107 or the Internet. For example, the monitor control unit 110 may transmit a data activity report indicating the type of data generated by devices connected over the local network 105, the total amount of data to be transmitted, and/or bandwidth needed for data transmission from the monitor control unit 110 to the application server 120.

The application server 120 may be a remote monitoring server for a provider, such as a home security alarm provider that monitors a property where the system 100 may be located. For instance, the application server 120 may exchange communications with the monitor control unit 110 over the carrier network 107. In some instances, the monitor control unit 110 may receive data activity reports from the monitor control unit 110 that includes information on the data generated by the cameras 130 and the client devices 140. In some examples, the data activity report may include information related to video footage collected by the cameras 130 within a property over a particular period of time (e.g., one day).

The application server 120 includes network availability modules 134, which may be used to perform a set of network tests on the carrier network 107 to determine a current state of available network resources over the carrier network 107. For instance, the monitor control unit 110 may test the data throughput over the carrier network 107 using various tools to determine the network latency. In some examples, the monitor control unit 110 may ping a carrier server associated with the carrier network 107 with various data payloads to determine, for example, data latency, upload speed, and/or average network speed. In some instances, if the network tests indicate low availability of resources over the carrier network 107 due to high traffic volume, the monitor control unit 110 may determine that the current state of the carrier network 107 is not robust. In some instances, if the network tests indicate high availability of resources over the carrier network 107, the monitor control unit 110 may determine that the current state of the carrier network 107 is robust. In such instances, the monitor control unit 110 may transmit data generated by devices connected over the local network 105, such as the cameras 130 and the client devices 140 to the application server 120 using the carrier network 107. The set of network tests performed on the carrier network 107 may be additionally or alternatively performed by the network module 112 of the monitoring control unit 110 and the network availability modules 134 may be additionally or alternatively located at the monitor control unit 110.

The network availability modules 134 may be used to dynamically determine the current status of the carrier network 107. For example, the network availability modules 134 may be used to periodically perform network tests of the carrier network 107 to determine the current status of the carrier network 107 and information about the status of the carrier network 107 may be stored in a network profile 124. The network profile 124 may be a repository that includes information related to available network resources of the carrier network 107. For example, the network profile 124 may include results from the set network tests conducted by the monitor control unit 110, historical data indicating prior network resources over the carrier network 107, and activity logs that indicate previous data transmissions over the carrier network 107.

In some instances, the network profile 124 may be locally stored on a local storage device that is connected to the local network 105. In such instances, the network profile 124 may be updated by the monitor control unit 110 periodically over particular periods of time (e.g., daily, weekly, monthly, etc.). In addition, the network profile 124 may be remotely stored on the application server 120. In such instances, the monitor control unit 110 may periodically transmit data activity reports to the application server 120 that include information to be included in the network profile 124, and, in response to receiving the data activity reports, the application server 120 may update the network profile 124. Also, the network profile 124 may be stored on a shared cloud network that is accessible by both the monitor control unit 110 and the application server 120. In such instances, the network profile 124 may be updated by either the monitor control unit 110 or the application server 120 based on particular circumstances. For example, network-intensive updates to network profile 124 may be carried out remotely by the application server 120 to conserve bandwidth over the carrier network 107, whereas updates, such as software and firmware updates, may be performed locally by the monitor control unit 110 over the local network 105.

In some instances, the network profile 124 may be updated by either the monitor control unit 110 or the application server 120 after an evaluation of the characteristics of the carrier network 107. In some examples, the carrier of the carrier network 107 may evaluate network characteristics that indicate latency, current available bandwidth, and network speeds, and transmit the information indicating the network characteristics to the monitor control unit 110 or the application server 120. In response, the network profile 124 may be updated to reflect the network characteristics of the carrier network 107.

The network profile 124 may be used by the application server 120 or monitor control unit 110 to determine when to initiate a data transmission process over the carrier network 107. For instance, in some implementations, the application server 120 may track the information included within the network profile 124 to determine activity patterns that indicate time periods of low network activity over the carrier network 107. In such instances, the applications server 120 may intelligently transmit instructions to the monitor control unit 110 to transmit data generated by the cameras 130 and the client devices 140 over the carrier network 107 during times of low network activity over the carrier network 107.

In some implementations, the network profile 124 may be used to confirm whether the current status of the carrier network 107 without performing any additional network tests that may be resource-intensive. In such implementations, the network availability modules 134 may perform network tests of the carrier network 107 over extended time periods (e.g., bi-monthly) and store the results of the network tests in the network profile 124. The information related to the most recently performed network tests may be extracted from the network profile 124 and then used to determine whether the current status of the carrier network 107 is robust enough for a data transmission without performing any additional network tests.

In some implementations, the network profile 124 may be used to distinguish between different types of data generated over the local network 105. For instance, in such implementations, the network profile 124 may include information related to the data to be transmitted over the carrier network 107 such as latency (e.g., time importance) of data, or the size of the data transmission payload. Information included in the network profile 124 may be used to determine if data generated by the cameras 130 or the client devices 140 should presently be transmitted over the carrier network 107. For example, the network profile 124 may indicate that video footage collected from cameras 130 that triggered an alarm event is high latency data because the data relates to security services that require an immediate transmission. In another example, the network profile 124 may indicate that internet activity data from client devices 140 is low latency data but have a small enough data transmission payload to be transmitted immediately without significantly impacting the bandwidth over the carrier network 107.

The sensors 132 may include a contact sensor, a motion sensor, a glass break sensor, or any other type of sensor included in an alarm system or security system. The sensors 132 also may include an environmental sensor, such as a temperature sensor, a water sensor, a rain sensor, a wind sensor, a light sensor, a smoke detector, a carbon monoxide detector, an air quality sensor, etc. The sensors 132 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 132 may include a radio-frequency identification (RFID) sensor that identifies a particular article that includes a pre-assigned RFID tag.

The monitoring system control unit 110 communicates with the modules 134 and the camera 130 to perform surveillance or monitoring. The modules 134 is connected to one or more lighting systems and is configured to control operation of the one or more lighting systems. The modules 134 may control the one or more lighting systems based on commands received from the monitoring system control unit 110. For instance, the modules 134 may cause a lighting system to illuminate an area to provide a better image of the area when captured by a camera 130.

The camera 130 may be a video/photographic camera or other type of optical sensing device configured to capture images. For instance, the camera 130 may be configured to capture images of an area within a building monitored by the monitoring system control unit 110. The camera 130 may be configured to capture single, static images of the area and also video images of the area in which multiple images of the area are captured at a relatively high frequency (e.g., thirty images per second). The camera 130 may be controlled based on commands received from the monitoring system control unit 110.

The camera 130 may be triggered by several different types of techniques. For instance, a Passive Infra-Red (PIR) motion sensor may be built into the camera 130 and used to trigger the camera 130 to capture one or more images when motion is detected. The camera 130 also may include a microwave motion sensor built into the camera and used to trigger the camera 130 to capture one or more images when motion is detected. The camera 130 may have a "normally open" or "normally closed" digital input that can trigger capture of one or more images when external sensors (e.g., the sensors 132, PIR, door/window, etc.) detect motion or other events. In some implementations, the camera 130 receives a command to capture an image when external devices detect motion or another potential alarm event. The camera 130 may receive the command from the controller 112 or directly from one of the sensors 132.

In some examples, the camera 130 triggers integrated or external illuminators (e.g., Infra-Red, Z-wave controlled "white" lights, lights controlled by the modules 134, etc.) to improve image quality when the scene is dark. An integrated or separate light sensor may be used to determine if illumination is desired and may result in increased image quality.

The camera 130 may be programmed with any combination of time/day schedules, system "arming state", or other variables to determine whether images should be captured or not when triggers occur. The camera 130 may enter a low-power mode when not capturing images. In this case, the camera 130 may wake periodically to check for inbound messages from the controller 112. The camera 130 may be powered by internal, replaceable batteries if located remotely from the monitor control unit 110. The camera 130 may employ a small solar cell to recharge the battery when light is available. Alternatively, the camera 130 may be powered by the controller's 112 power supply if the camera 130 is co-located with the controller 112.

In some implementations, the cameras 130, the sensors 132, or the modules 134 may be capable of exchanging communications directly with the application server 120 without the use of the monitor control unit 110. In some instances, the cameras 130, the sensors 132, and the modules 134 may be used to determine network characteristics associated with the carrier network 107, which is then used to transmit data from the monitor control unit 110 to the application server 120 over the carrier network 107. In some instances, the cameras 130, the sensors 132, or the modules 134 may also follow commands related to data transmissions from the monitor control unit 110 or the application server 120. For example, the cameras 130, the sensors 132, or the modules 134 may receive instructions to upload data (e.g., security video footage, thermostat information, etc.) either to the monitor control unit 110 over the local network 105, or directly to the application server 120 over the carrier network 107.

The client devices 140 may be devices within the property that exchange network communications over the local network 105, such as smartphones, tablets, personal computers (PCs), network-enabled media players, home entertainment systems, cloud storage devices, and other types of network devices. For example, the client devices 140 may access a service made available by the application server 120 on the local network 105, such as a multimedia subscription. The data generated by the client devices 140 may include any type of network activity over the local network 105, which may be monitored by the monitor control unit 110.

In some implementations, the system 100 may additionally include storage devices connected to the local network 105. The storage devices may be used to temporarily cache data to be transmitted prior to transmitting to the application server 120 over the carrier network 107. For example, if the current status of the carrier network 107 indicates high network activity and the latency of the data to be transmitted is high such that the data is not time sensitive, the data to be transmitted may be temporarily be stored in the storage devices until the network activity over the carrier network 107 decreases such that the data transmission does not impact the bandwidth of the carrier network 107. In such examples, the application server 120 may transmit an instruction to the monitor control unit 110 once the current status of the carrier network 107 indicates that the data to be transmitted may be transmitted over the carrier network 107.

In some implementations, data transmissions over the carrier network 107 may be performed based on a designated importance of the data. An importance associated with the data to be transmitted may initially be designated by the user over the local network 105. For example, the network profile 124 may include a field, associated with each data to be transmitted, that indicates the importance for data to be transmitted previously designated by the user on the client devices 140. In such examples, data that is designated to be important may be given priority transmission over the carrier network 107 than data that is not designated to be important. In some instances, where the monitor control unit 110 initially assigns an importance based on the network characteristics, the user may have the ability to adjust or override the importance of the data to be transmitted such that the data may be transmitted even if the monitor control unit 110 initially determines to defer the data to be transmitted. In this regard, the data transmissions over the carrier network 107 be performed both dynamically and in response to user control.

In some implementations, the system 100 may be used to develop improved pricing strategies for users that transmit data over the carrier network 107. For instance, the system architecture of the system 100 may be used to develop a demand-based data transmission schedule with carriers that operate the carrier network 107. For example, pricing rates for data transmissions over the carrier network 107 may be adjusted based on the throughput over the carrier network 107 over different time periods such that pricing for data transmissions during peak time periods with high throughput are priced higher compared to pricing for data transmissions during non-peak time periods with low throughput. In these examples, an organization may use the system 100 to perform data transmissions during non-peak time periods to reduce costs associated with use of the carrier network 107. In this regard, the data to be transmitted may be deferred from a peak time period to a non-peak time period to maximize cost savings associated with large volumes of data transfers over the carrier network. In some instances, information related to data transmissions, such as how frequently data is transmitted over the carrier network 107, the current and expected pricings associated with data transmissions, may be tracked over time to determine cost-effective transmission schedules over the carrier network 107.

Figure 2:
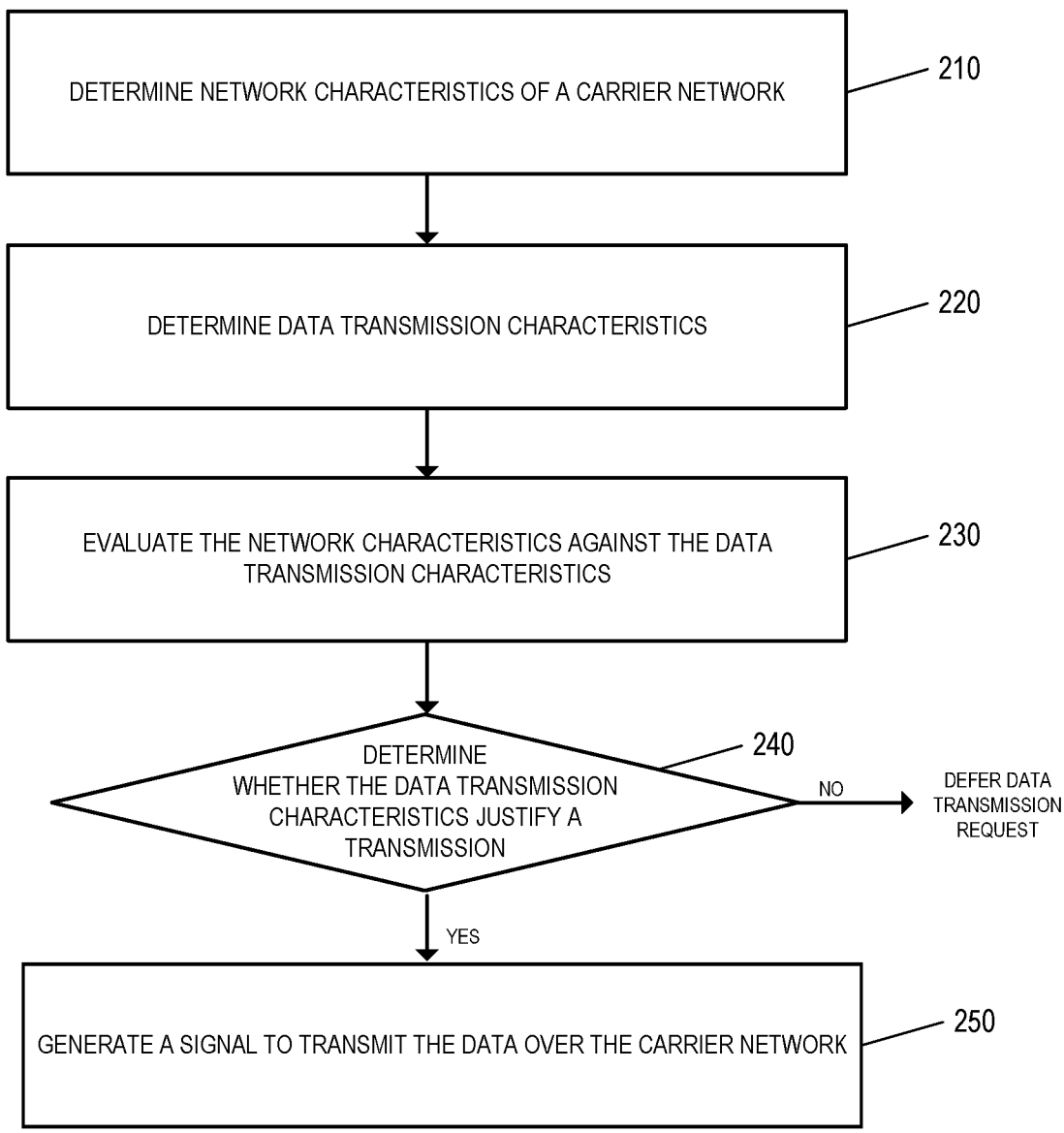
FIG. 2 illustrates an example process for comparing network characteristics and data transmission characteristics.

FIG. 2 illustrates an example process 200 for comparing network characteristics and data transmission characteristics. Briefly, the process 200 may include determining network characteristics of a carrier network (210), determining data transmission characteristics (220), evaluating the network characteristics against the data transmission characteristics (230), determining whether the data transmission characteristics justify a transmission (240), and generating a signal to transmit the data over the carrier network if the data transmission characteristics justify a transmission (250).

In more detail, the process 200 may include determining network characteristics of a carrier network (210). For example, the monitor control unit 110 or the application server 120 may monitor the carrier network 107 to determine network attributes such as the current data throughout over the carrier network 107, the available bandwidth for subsequent data transmissions, and a transmission speeds that may impact the latency of the data to be transmitted.

In some instances, the network characteristics may be used to generate different pricing strategies for data to be transmitted over the carrier network 107. For example, the pricing for data transmissions over the carrier network 107 during time periods of low throughout may be lower compared to the pricing for data transmissions over the carrier network during time periods of high throughput.

The process 200 may include determining data transmission characteristics (220). For example, the monitor control unit 110 or the application server 120 may determine the file sizes of the data to be transmitted, the importance of the data to be transmitted, or the time sensitivity associated with the data being transmitted to the application server 120. In some instances, the control unit 110 or the application server 120 may aggregate the different data transmission characteristics to generate a transmission queue for the data to be transmitted. For example, the data with transmission characteristics that indicate a higher urgency for transmission may be placed higher on the queue than data with transmission characteristics that indicate a lower urgency for transmission.

The process 200 may include evaluating the network characteristics against the data transmission characteristics (230). For example, the monitor control unit 110 or the application server 120 may compare the network characteristics against the data transmission characteristics, and determine if the carrier network 107 should presently be used to transmit the data to be transmitted. In some instances, the network attributes may be represented as a score that is compared to a threshold value to determine if the data should presently be transmitted over the carrier network 107. For example, if the value representing the network attributes exceeds the threshold value, then the monitor control unit 110 or the application server 120 may initiate a data transmission over the carrier network 107.

The process 200 may include determining whether the data transmission characteristics justify a transmission (240). For example, based on evaluating the network characteristics against the data transmission characteristics, the monitor control unit 110 or the application server 120 may determine whether data transmission over the carrier network 107 presently justifies a data transmission. In some instances, the determination may be based on a weighted multi-factorial analysis where each individual network characteristic and transmission characteristic is assigned a particular weight within an aggregate score for the network characteristics the transmission characteristics, respectively. The aggregate score may reflect user-specified preferences, or dynamic constraints based on the present network conditions over the carrier network 107. For example, if the user indicates that costs associated with the data transmission as the important factor in transmitting data, then the individual network characteristic that impacts pricing of the data transfer (e.g., present data throughput) may be assigned a higher weight than another individual network characteristic (e.g., transmission speed) within the aggregate network characteristic score. In this regard, the determination of the data transmission may be both be individualized for particular users, and consider relevant factors in determining whether the characteristics justify a transmission.

In some instances, if the data to be transmitted has a significant file size that exceeds the size indicated by the network characteristics, but the data to be transmitted is identified as including highly priority information, then the data may still be transmitted regardless of the file size exceeds a recommended value because the data priority characteristic has a larger weight compared to the file size characteristic of the data to be transmitted. In other examples, if the data to be transmitted has a relatively small size that may not impact the throughput over the carrier network 107, as indicated by the network characteristics, but is not designated as high priority data, then data transmission may be deferred because the current network characteristics indicate that the present throughput of the carrier network 107 is sufficiently high to make the present transmission prohibitively expensive.

The process 200 may include generating a signal to transmit the data over the carrier network if the data transmission characteristics justify a transmission (250). For example, the monitor control unit 110 or the application server 120 may generate a signal to transmit the data over the carrier network 107 if the transmission characteristics of the data justify a transmission based on the network characteristics of the carrier network 107. In response, data transmission process over the carrier network 107 may be initiated.

Alternatively, in some instances, the data transmission over the carrier network 107 may be deferred because the transmission characteristics of the data indicate that the transmission is not justified based on the network characteristics of the carrier network 107. In some instances, the deferred data may be locally cached on the monitor control unit 110 or a local storage device that is connected over the local network 105.

In some implementations, the cached data may be periodically analyzed for subsequent transmissions after an initial deferred data transmission. For example, the cached data may be evaluated over particular time periods (e.g., hourly) against updated network characteristics of the carrier network 107 for later time points to determine if the transmission attributes justify a transmission at a subsequent time point. In such examples, the cached data may be re-evaluated either for a particular number of retries (e.g., ten re-evaluations after an initial deferral), or for a particular time window (e.g., up to 48 hours after an initial deferral for conducting re-evaluations). The re-evaluations may be performed similarly to the techniques described with respect to step 210, but may additionally include other factors within the calculus that indicate the value, relevancy, or the necessity of the cached data at the later time point to justify the subsequent data transmission. The re-evaluation may include determining whether the data no longer requires transmission if newer forms of the data are present within the system 100. For example, if the cached data is no longer relevant, then the cached data may be purged from the cache to preserve space, whereas if there is cached data is still determined to be important, then the cached data may be transmitted in a subsequent transmission at a later time point.

Figure 3:
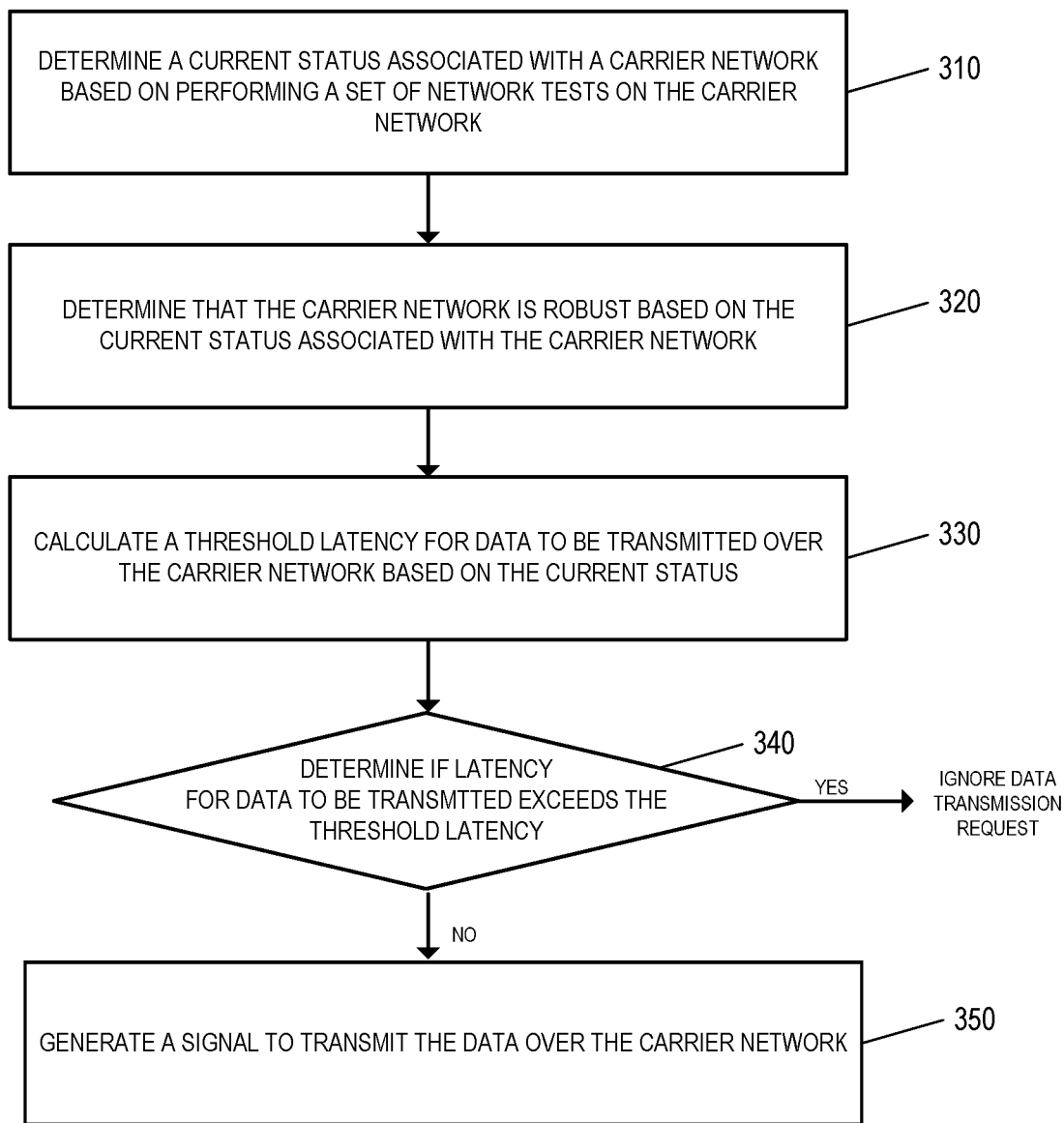
FIG. 3 illustrates an example of a process for wirelessly transmitting data over a carrier network.

FIG. 3 illustrates an example process 300 for wirelessly transmitting data over a carrier network. Briefly, the process 300 may include determining a current status associated with a carrier network based on performing a set of network tests on the carrier network (310), determining that the carrier network is robust based on the current status associated with the carrier network (320), calculating a threshold latency for data to be transmitted over the carrier network based on the current status (330), determining if latency for data to be transmitted exceeds the threshold latency (340), and generating a signal to transmit the data over the carrier network if the latency for the data to be transmitted does not exceed the threshold latency (350).

In more detail, the process 300 may include determining a current status associated with a carrier network based on performing a set of network tests on the carrier network (310). For example, the network availability modules 134 of the application server 120 may perform a set of network tests that include determining current network activity over the carrier network 107 and determining a current status based on the results of the set of network tests. For instance, the network availability modules 134 may determine the network bandwidth, the data throughput, an average upload speed, and/or the number of clients connected over the carrier network 107. The set of network tests may be additionally or alternative performed by the network module 112 of the monitor control unit 110.

The process 300 may include determining that the carrier network is robust based on the current status associated with the carrier network (320). For example, the application server 120 may determine that the carrier network 107 is robust based on the results of the set of network tests performed. For instance, the carrier network 107 may be determined to be robust if one of the measured network parameters meets a specified value. For example, if the network activity over the carrier network 107 is below a threshold value, the application server 120 may determine that the carrier network 107 is robust.

In some implementations, the determination that the carrier network 107 is robust may include balancing the various network parameters. For example, if the number of client devices connected to the carrier network 107 is low, but the available bandwidth is high, the application server 120 may determine that the carrier network 107 is not robust based on determining that a single client device over the carrier network 107 may be consuming a significant portion of the total bandwidth, reducing the available bandwidth for transmitting data over the carrier network 107. In some examples, if the measured upload speed over the carrier network 107 is low, but the network activity over the carrier network 107 is low (e.g., during night time), then the application server 120 may still determine that the carrier network 107 is presently robust to perform a data transmission operation.

The process 300 may include calculating a threshold latency for data to be transmitted over the carrier network based on the current status (330). For example, the application server 120 may use the measured network parameters from the set of network tests performed to calculate a threshold latency that allows a maximum tolerance for the carrier network 107. For instance, the maximum tolerance may indicate a threshold size for the data to be transmitted over the carrier network 107 without significantly impacting the existing network traffic over the carrier network 107.

In some implementations, the calculated threshold latency for data to be transmitted may be adjusted based on the type of data to be transmitted. For example, a higher threshold latency for critical data (e.g., security footage, alarm signal data, home maintenance, etc.) may be calculated compared to non-critical data (e.g., internet activity data, user media content, etc.). In such examples, the higher threshold latency may allow for the critical data to be transmitted more frequently than less critical data.

The process 300 may include determining if latency for data to be transmitted exceeds the threshold latency (340). For example, the application server 120 may compare the latency of the data to be transmitted to the threshold latency to determine if the latency of the data to be transmitted exceeds the threshold latency. In some instances, if the latency for the data to be transmitted exceeds the threshold latency, then the application server 120 may defer the data transmission request until the threshold latency increases based on the bandwidth over the carrier network 107. In some instances, if the latency of the data to be transmitted is below the threshold latency, then the application server 120 may generate a signal to transmit the data over the carrier network 107.

In some implementations, the threshold latency for the carrier network 107 may be adjusted based on the current status associated with the carrier network 107. For example, in some instances, if the current status indicates a high bandwidth availability over the carrier network 107, then the threshold latency may be increased to allow data with high latency (e.g., security video footage) to be transmitted over the carrier network 107. In some instances, if the current status indicates a low bandwidth availability over the carrier network 107, then the threshold latency may be decreased to only allow data with low latency (e.g., smaller data transmissions) to be transmitted over the carrier network.

The process 300 may include generating a signal to transmit the data over the carrier network if the latency for the data to be transmitted does not exceed the threshold latency (350). For example, the application server 120 may generate a signal to the monitor control unit 110 to transmit the data over the carrier network 107 if the latency for data to be transmitted does not exceed the threshold latency. In response, the monitor control unit 110 may initiate a data transmission process over the carrier network 107.

In some implementations, the data to be transmitted may be locally stored on a storage device directly configured to the monitor control unit and/or exchanges communications with the monitor control unit 110 over the local network 105. In such implementations, the monitor control unit 110 may initiate the data transmissions process over the carrier network 107. Also, the data to be transmitted may be cached on a network storage device that exchanges communications with the monitor control unit 110 or the application server 120. In such implementations, the monitor control unit 110 may initiate the data transmission process, whereas in some instances, the application server 120 may initiate the data transmission process.

Figure 4:
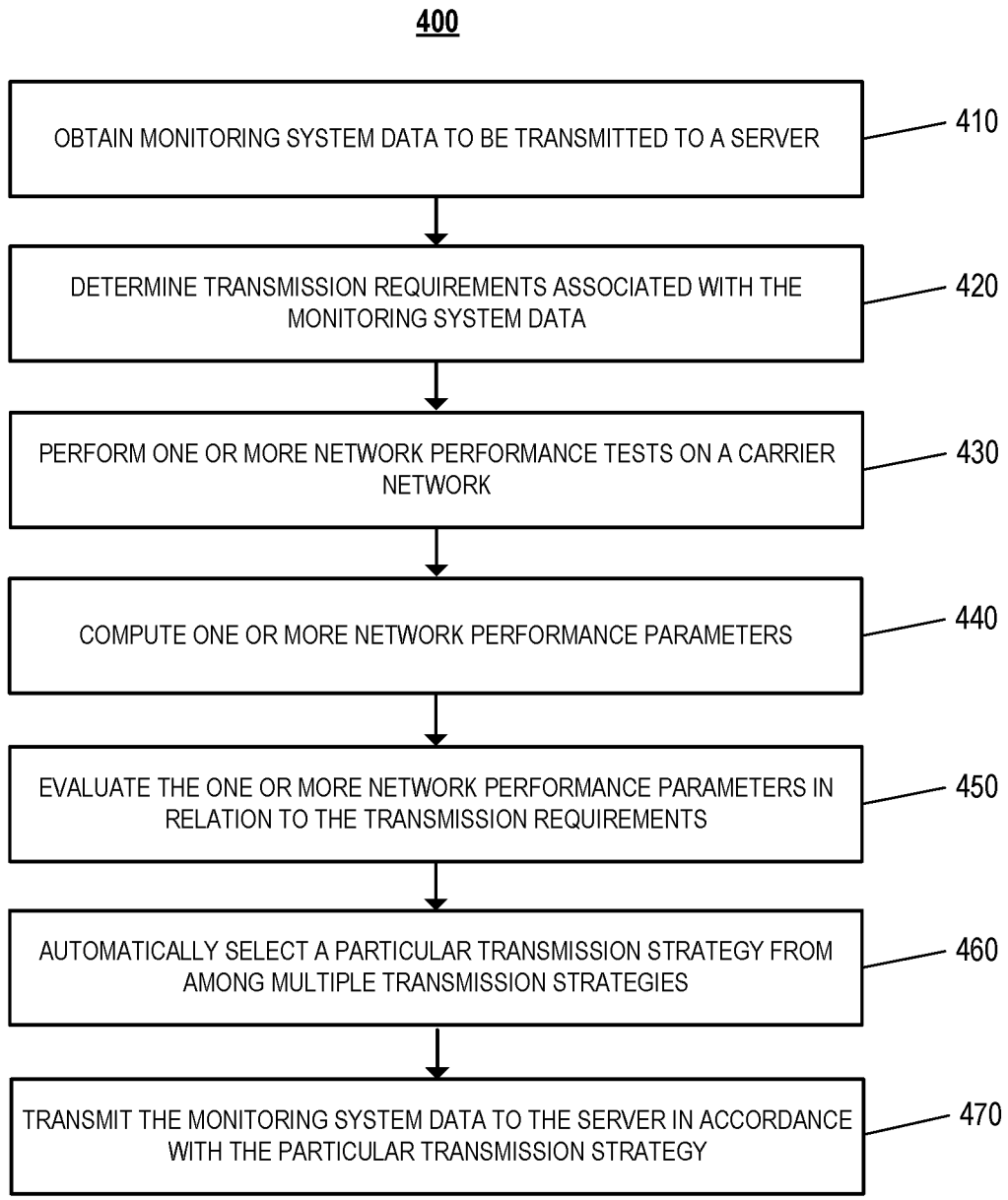
FIG. 4 illustrates an example of a process for selectively transmitting data based on comparing network characteristics and data transmission characteristics.

FIG. 4 illustrates an example of a process 400 for selectively transmitting data based on comparing network characteristics and data transmission characteristics. Briefly, the process 400 may include obtaining monitoring system data to be transmitting to a server (410), determining transmission requirements associated with the monitoring system data (420), performing one or more network performance tests on a carrier network (430), computing one or more network performance parameters (440), evaluating the network performance parameters against the data transmission characteristics (450), automatically selecting a particular transmission strategy from among multiple transmission strategies (460), and transmitting the monitoring system data to the server in accordance with the particular transmission strategy (470).

In more detail, the process 400 may include obtaining monitoring system data to be transmitting to a server (410). For instance, the monitor control unit 110 may obtain monitoring system data to be transmitted to the application server 120. As described above, the monitoring system data may include data collected by the cameras 130, the sensors 132, and/or the modules 134.

The process 400 may include determining transmission requirements associated with the monitoring system data (420). For instance, the monitor control unit 110 may determine transmission requirements associated with the monitoring data obtained from the cameras 130, the sensors 132, and/or the modules 134. As described above, the transmission requirements can be used by the monitor control unit 110 to determine certain aspects relating to how the obtained data should be transmitted to the application server 120.

In some instances, a transmission requirement includes a latency requirement that describes a threshold time period for transmitting the monitoring system data to the application server 120. The latency requirement can be used to indicate respective urgencies associated with transmitting different types of monitoring system data (e.g., a higher latency requirement indicating a lower threshold time period for transmission compared to a lower latency requirement indicating a higher threshold time period for transmission). For example, life-critical data that indicates a present alarm condition inside a property may have a higher latency requirement compared to routine monitoring data (e.g., occupancy data, HVAC activity data, motion data, etc.) because transmission of the life-critical data is extremely time-dependent. In comparison to life-critical data, routine monitoring data may additionally have a lower latency requirement because the volume of data that is collected is greater, increasing the file size associated with the monitoring system data to be transmitted. For example, security video footage data to be periodically backed up on the application server 120 can include captured video footage over eight-hour time periods, generating large volumes of data to be transmitted to the server 120.

The latency requirements for the different types of monitoring system data can be determined based on, for example, prior monitoring system data associated with the property that is monitored by the system 100, or other properties that are determined to be similar to the property. For instance, referring to the example of life-critical data, the system 100 may obtain historical data associated with prior successful transmissions of life-critical data in order to identify an appropriate threshold time period to configure for the latency requirement. In other instances, data associated with prior alert conditions of other properties may be used to cluster monitoring system data based on property type, alert condition, or other types of data categorizations. The clustered data can then be used to intelligently configure an appropriate threshold time period for transmitting the life-critical monitoring data.

In other instances, a transmission requirement includes a cost requirement for transmitting the monitoring system data to the application server 120. The cost requirement can be used to indicate an anticipated amount of resources (e.g., bandwidth on the carrier network 107, transmission cost on the carrier network) associated with transmitting different types of monitoring system data over the carrier network 107. The cost requirements for different types of monitoring system data can be used to reflect the different anticipated costs associated with each monitoring system data. For example, monitoring system data that are collected less frequently (e.g., daily thermostat configuration updates) can have a lower cost requirement compared to other types of monitoring system data that are either monitored more frequently, or generate larger volumes of data (e.g., real-time security footage). In this example, a low cost requirement reflects a low bandwidth requirement over the carrier network 107 or a low associated cost for fully transmitting monitoring system data over the network (e.g., smaller data files taking less time and bandwidth to be transmitted over a network).

In some instances, the monitor control unit 110 also determines multiple transmission requirements for the monitor system data. For example, as described above, the monitor control unit 110 may determine both a latency requirement and a cost requirement for the same monitoring system data. In such instances, the different transmission requirements can be compared in relation to one another to make an effective determination as to whether data should be transmitted over the carrier network 107. For example, life-critical alarm condition alerts have a high latency requirement (e.g., low threshold time for transmission) but a low cost requirement (e.g., small file size and corresponding bandwidth costs over the carrier network 107. Thus, in this example, an analysis of both the latency requirement and the cost requirement can be used to prioritize the latency requirement over the cost requirement since this requirement has a greater potential impact on the user. In another example, routine monitoring data have a low latency requirement (e.g., high threshold time for transmission) but a high cost requirement (e.g., large file sizes and corresponding bandwidth costs over the carrier network 107. In this way, the monitor control unit 110 can concurrently analyzing multiple transmission requirements to uniquely process different types of monitoring system data.

The process 400 may include performing one or more network performance tests on a carrier network (430). For instance, the monitor control unit may perform one or more network performance tests on the carrier network 107. As described above, the carrier network 107 may enable the cameras 130, the sensors 132, and/or the modules 134 to communicate with the application server 120. In some instances, the cameras 130, the sensors 132, and/or the modules 134 may communicate over the carrier network 107 through the monitor control unit 110, which operates as a transmitting device that forwards data collected by the cameras 130, the sensors 132, and/or the modules 134 over the carrier network 107. In other instances, the cameras 130, the sensors 132, and/or the modules 134 may be configured to communicate directly over the carrier network 107.

The network performance tests performed by the monitor control unit 110 may be used to evaluate the present conditions of the carrier network 107 in relation to transmitting the monitoring system data. In some instances, the monitor control unit 110 performs a latency evaluation network performance test on the carrier network 107. As described above with respect to FIG. 3A, the monitor control unit 110 may query the carrier network 107 to obtain information relating to an anticipated time to particular size of data over the carrier network 107. This can be accomplished by transmitting small test packages and measuring the time to complete the transmission over the carrier network 107.

In other instances, the monitor control unit 110 performs a bandwidth evaluation network performance test on the carrier network 107. As described above, the monitor control unit 110 may obtain information associated with the current available bandwidth over the carrier network 107. The available bandwidth may indicate a number ongoing processes that are presently occupying network resources over the carrier network 107 (e.g., range of occupied frequencies), a percentage of total bandwidth that is presently occupied by the other processes, or a percentage of total bandwidth available to be used for subsequent processes.

In other instances, the monitor control unit 110 performs a network speed evaluation network performance test on the carrier network 107. As described above, the monitor control unit 110 may check the download and/or upload speed over the carrier network 107. For example, the monitor control unit 110 may perform a line speed test to measure real-time download or upload speeds, determine the amount of time to complete specific transmission tasks, or measure the download speed of the carrier network (e.g., in Megabits per second). As described above, such tests can be performed in real-time to track the network conditions of the carrier network 107, or perform the tests at specified intervals (e.g., hourly).

The process 400 may include computing one or more network performance parameters (440). For instance, the monitor control unit 110 may compute one or more network performance parameters based on results of the network performance tests performed on the carrier network 107. As described above, the network performance parameters are generally descriptive of the current availability on the carrier network 107 to transmit data to the application server 120. For instance, a network performance parameter may include a latency parameter for the carrier network 107 based on the results of the latency evaluation network performance test described above in step 430. As described above with respect to step 420, the latency parameter reflects an anticipated or estimated time to transfer a particular size of monitoring system data over the carrier network 107.

In other instances, a network performance parameter may include a bandwidth parameter for the carrier network 107 based on the results of the bandwidth evaluation network performance test described above in step 430. The bandwidth parameter reflects a currently available bandwidth (e.g., number of available connections, percentage of overall available bandwidth, etc.) that can be used to transmit the monitoring system data to be transmitted to the application server 120. For example, the bandwidth parameter enables the monitor control unit 110 to determine if the carrier network 105 includes sufficient network resources to allow the transmission of a particular volume of monitoring system data.

In other instances, a network performance parameter may include a network speed parameter for the carrier network 107 based on the results of the network speed evaluation network performance test descried above in step 430. As described above, the network speed parameter reflects an estimated speed associated with transmitting a particular volume of monitoring system data over the carrier network. For example, network parameter enables the monitor control unit 110 to estimate the total time required to transmit a portion of monitoring system data to be transmitted over the carrier network 107.

The process 400 may include evaluating the network performance parameters in relation the transmission requirements (450). For instance, the monitor control unit 110 may perform the evaluation based on comparing the network performance parameters and the transmission requirements. In some instances, the evaluation may include comparing the computed latency parameter for the carrier network 107 with the latency requirement for transmitting the monitoring system data to the application server 120. For example, the monitor control unit 110 may determine that the carrier network has sufficient speed to transmit a portion of monitoring system data if the computed latency parameter for the carrier network 107 exceeds the latency requirement for the portion of monitoring system data. As described above, because different types of monitoring system data can have different transmission requirements, the carrier network 107 may be determined to be capable of having sufficient speed to transmit some types of monitoring system data, but not others. For example, the carrier network 107 may have sufficient speed to be capable of transmitting low priority monitoring system data (e.g., routine monitoring system data), but not have sufficient speed to be capable of transmitting life-critical monitoring system data (e.g., alarm condition notifications).

In other instances, the evaluation may include determining a cost of transmission for the carrier network 107 and comparing the determined cost of transmission with the cost requirement for transmitting the monitoring system data to the application server 120. For example, the monitor control unit 110 may determine that the carrier network 107 can sufficiently support a cost associated with transmitting a portion of monitoring system data over the carrier network 107 if the cost requirement for the portion of monitoring system data is satisfied by the cost parameter computed for the carrier network 107. For example, the monitor control unit 110 may determine that the carrier network 107 can support transmission of low cost monitoring system data (e.g., thermostat control signal data that has a small file size), but is unable to support transmission of high cost data (e.g., real-time security footage data over an eight-hour time frame that has a large file size).

In other instances, the evaluation includes comparing both the latency requirement and cost requirement to the computed latency parameter and the determined cost of transmission, respectively, computed for the carrier network 107. As described above, because different types of monitoring system data can have different latency requirements and cost requirements, the monitor control unit 110 may combine individual evaluations relating to respective network parameters in order to generate an aggregate evaluation indicating whether the carrier network 107 can, as a whole, support the transmission of a portion of monitoring system data. As an example, the monitor control unit 110 may determine, for a portion of life-critical alarm condition data, that an associated latency requirement is satisfied but that the cost requirement is not. In this example, the monitor control unit 110 may prioritize the latency requirement over the cost requirement because the data includes information that may safety conditions of the property. In this regard, evaluations of individual requirements of different types of monitoring system data can be prioritized based on various factors such as a potential impact on the due to property resulting from a failure to transmit the different types of monitoring system data.

The process 400 may include automatically selecting a particular transmission strategy from among multiple transmission strategies (460). For instance, the monitor control unit 110 may select a particular transmission strategy to use in transmitting the monitoring system data to the application server 120. The selection may be based on the evaluation of the network performance parameters in relation to the transmission requirements associated with the monitoring system data as described above. In some instances, the multiple transmission strategies include one transmission strategy that immediately transmits the monitoring system data to the server over the carrier network, and another transmission strategy defers transmission of at least a portion of the monitoring system data to the server over the carrier network. As an example of the first transmission strategy, the monitor control unit may determine to immediate transmit life-critical alarm notification data due to a high latency requirement that supersedes a high cost requirement that may or may not be satisfied by the cost parameter of the carrier network 105. In this example, the critical nature of the life-critical alarm notification data due to the potential safety concerns can be used to select a transmission strategy that transmits data to the application server 120 as soon as possible.

As an example of the second transmission strategy, the monitor control unit 110 may determine that certain portions of monitoring system data corresponding to security data indicating a safety breach within a property should be immediately transmitted, whereas other portions of the monitoring data corresponding to unrelated HVAC data should be deferred from transmission. In this example, the deferral of the unrelated HVAC data causes a smaller volume of data to be transmitted over the carrier network 107, reducing the required bandwidth for transmission and the associated cost due to small data volume, while also ensuring that the urgency associated with the security data is satisfied.

In other instances, the decision to defer some portions of the monitoring system data and immediate transmit other portions of the monitoring system data can be based on file size associated with each portion irrespective of urgency. For instance, a portion corresponding to HVAC activity can be immediately transmitted over the carrier network 107 whereas another portion corresponding to real-time security video footage can be deferred due to the file size of the HVAC activity data having a smaller file size compared to the security video footage. In this example, the anticipated cost associated with transmitting the security video footage is too high to warrant current transmission, but because the HVAC pattern activity data involves a smaller size, the anticipated cost is much lower to impose a minimal anticipated cost for the data transmission.

In some instances, where the monitoring system data to be transferred include similar types of data or different types of data with high latency and cost requirements, an entirety of the monitoring system data can be deferred altogether. For example, if the monitoring system data to be transferred includes large volumes of video security footage data and large volumes of motion sensor data, then the monitor control unit 110 may defer the transmission of the entire monitoring system data.

Deferrals in transmitting either portions of, or the entire monitoring system data can be for fixed time periods (e.g., three hours), or for variable time periods based on the conditions associated with the carrier network 107. For example, deferral may be set to a fixed time period, if the evaluations of the network performance parameters indicate a time-dependent unavailability over the carrier network 107 (e.g., a temporary period of low bandwidth availability during a high traffic time period). In this example, the deferral may be set to a time period such that the monitoring system data is transferred during a time in which the cost associated with transmission and/or the potential latency associated with transmission is minimized (e.g., between 11 PM and 4 AM). In another example, deferral may be set to variable time periods based on either on the present conditions of the carrier network 107 or the transmission requirements of the monitoring system data to be transmitted. For instance, if monitoring system data to be transferred includes routine monitoring data with a low latency requirement and a high cost requirement, then transmission of such data may be deferred indefinitely until other types of data with greater transmission requirements are prioritized for transmission over the carrier network 107. For example, routine monitoring data may be placed last in a transmission queue until higher priority data such as security data and occupancy data is successfully transmitted over the carrier network 107. In this regard, transmission pathways with variable deferral can be used to prioritize the transmission of monitoring data in a cost-effective manner.

In some instances, the monitor control unit 110 selects a transmission strategy that modifies the monitoring system data to reduce at least one of the transmission requirements associated with the monitoring system data. The monitor control unit 110 may filter and/or selectively transmit processed versions of the monitoring system data to either reduce the cost requirement (e.g., reducing overall file size), or the latency requirement (e.g., extracting portions of data specifically related to highly urgent data). As an example, the monitoring system data to be transmitted may include security video footage over a seven-day time frame. Because this imposes a high cost requirement due to the large file size, the monitor control unit 110 may extract only nighttime security footage (e.g., footage that is more likely to include potential breaches safety), and then transmit the filtered security footage data over the carrier network 107.

The process 400 may include transmitting the monitoring system data to the server in accordance with the particular transmission strategy (470). For instance, after selecting a transmission strategy, the monitoring control unit 110 may transmit the monitoring system data in accordance with the selected transmission strategy. As described above, different transmission strategies can include, for example, the portions of data to transmit over the carrier network 107 (e.g., a subset of the monitoring system data, or the entire monitoring system data to be transmitted), a time to transmit the monitoring system data over the carrier network 107 (e.g., immediately, after a fixed deferral period, or after a variable deferral period), or to modify the monitoring system data in order to reduce at least one of the transmission requirements for the transmission sequences.

In some implementations, the monitor control unit 110 may transmit the monitoring system data to the application server 120 over the Internet using an Ethernet connection. In such implementations, the monitor control unit 110 may be connected to a network router than enables the monitor control unit 110 to transmit outgoing connects over a wide area network (WAN). Thus, the Ethernet connection can be an alternative means by which the monitoring system data is transmitted from the monitor control unit 110 to the application server 120.

Figure 5:
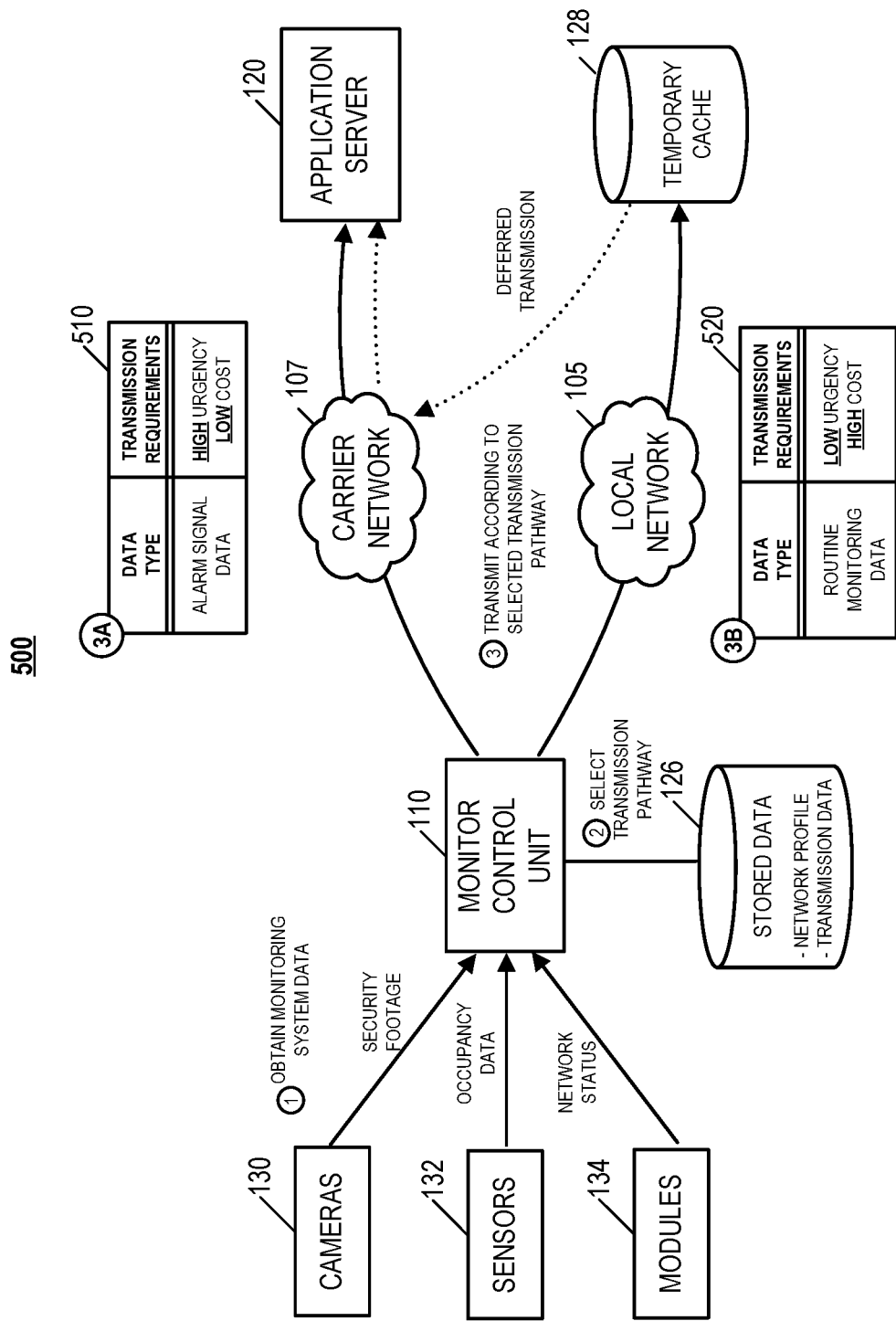
FIG. 5 illustrates an examples of transmission strategies for transmitting data to a remote server.

FIG. 5 illustrates an examples of transmission strategies for transmitting monitoring system data to the application server 120. In the example depicted, the monitor control unit 110 may selectively transmit collected monitoring system data immediately over the carrier network 107 to the application server 120, or initially over the local network 105 to a temporary cache 126, and then later over the carrier network 107 through a deferred transmission. As described above, this determination can be based on comparing transmission requirements associated with different types of monitoring system data with network performance parameters computed for the carrier network 107. The monitor control unit 110 then selects a suitable transmission strategy based on analyzing various factors (e.g., anticipated cost associated with data transmission, estimated time to complete transmission, minimum network bandwidth required for transmission).

In step (1), the monitor control unit 110 initially obtains monitoring system data from the cameras 130, the sensors 132, and/or the modules 134. As described above, the monitoring system data can include various types of sensed data associated with conditions of the property. For example, data obtained from the cameras 130 may include alarm signal data indicating that an intruder has breached the property, data obtained from the sensors 132 may include occupancy data for different regions of the property, and data from the modules 134 may indicate a current network status associated with the carrier network 107.

The monitor control unit 110 may periodically obtain the monitoring system data over designated time intervals (e.g., hourly), or on an ad-hoc basis based on the type of monitoring system data collected by the cameras 130, the sensors 132, and the modules 134. In the first instance, the monitor control unit 110 exchanges data communications with the cameras 130, the sensors 132, and the modules 134 and transmits the collected data at a specified time point (e.g., backing up collected data to the application server 120 every day at 3 AM when system activity is low). In the second instance, the monitor control unit 110 transmits the collected once a set of conditions have been satisfied (e.g., a minimum volume of collected data required to initiate a transmission), or based on a specified severity of collected monitoring system data. For example, to reduce the frequency of data transmissions to the application server 120, the monitor control unit 110 may aggregate the collected monitoring system data once the data volume threshold has been met. In another example, the monitor control unit 110 may immediately initiate a data transmission process to the application server 120 if the collected monitoring system data indicates an identified emergency condition at the property (e.g., a high detected ambient temperature indicating a fire at the property, or security footage data indicating a breach at the property).

In step (2), after obtaining the collected monitoring system data, the monitor control unit 110 then selects a transmission strategy for transmitting the collected monitoring system data to the application server 120. As described above with respect to FIG. 4, the monitor control unit 110 may select a suitable transmission strategy that satisfies the transmission requirements of the different types of monitoring data included within the monitoring system data collected by the cameras 130, the sensors 132, and/or the modules 134. For example, the monitor control unit 110 may determine that the alarm signal data obtained from the cameras 130 has a high latency requirement due to the high urgency associated with transmission, and a low cost requirement due to the cost being less important than quickly transmitting life-critical data. In this example, the monitor control unit 110 may select a transmission strategy that prioritizes latency over cost.

Alternatively, in the other example, the monitor control unit 110 may determine that the routine monitoring data obtained from the sensors 132 has a low latency requirement due to a low urgency associated with transmission, and a high cost requirement due to the large volume of data to be transferred to the application server 120. In this example, the monitor control unit 110 may select a transmission strategy that priorities cost over latency.

In some implementations, the monitor control unit 110 may select the transmission strategy based on information included within the stored data 126. The stored data 126 may include information associated with the network profile 124 described above with respect to FIG. 1, and/or historical transmission data indicating transmission requirements of data that was previously transmitted to the application server 120. The information included within the stored data 126 can be used to determine respective transmission requirements for the collected monitoring system data, compute network performance parameters for the carrier network 107, or evaluate the respective transmission requirements to the network performance parameters as described above with respect to FIG. 4.

In step (3), once the monitor control unit 110 has selected a transmission strategy for each type of monitoring system data, the monitor control unit 110 may then transmit each type of monitoring system data in accordance with the selected transmission strategy. As depicted in the figure, the monitor control unit 110 transmits the alarm signal data obtained from the cameras 130 in accordance with a transmission strategy 510, and transmits the routine monitoring data obtained from the sensors 132 in accordance with a transmission strategy 520.

In the two examples depicted, the monitor control unit 110 selects different transmission pathways for each data type due to the variations in transmission requirements associated with each. For instance, as discussed above, the alarm signal data has a high urgency requirement and a low cost requirement because the immediacy with which the data is transmitted is prioritized over the potential cost of transmission. The routine monitoring data, however, has a low urgency requirement and a high cost requirement because the data does not involve life-critical information and has a high volume that would be prohibitively expensive to presently transmit over the carrier network 107.

Referring initially to the transmission strategy 510, the monitor control unit 110 may determine to immediately transmit the alarm signal data over the carrier network 107. In some instances (e.g., a fire at the property), this is due to the property having lost power which then prevents transmissions over the local network 105 because the network router is no longer connected to the Internet. In other instances, the decision to immediately transmit the alarm signal data over carrier network 107 may be based on determining that the urgency associated with the alarm signal data should be prioritized over the cost requirement for the data since the necessity to transmit life-critical information to the application server as fast as possible is worth an added cost of transmission over the carrier network 107.

Referring now to the transmission strategy 520, the monitor control unit 110 may determine to transmit the routine monitoring data over the local network 105 to the temporary cache 128 instead of immediately transmitting the data over the carrier network 107. In this example, the monitor control unit 110 selects a transmission strategy that avoids transmission over the carrier network 107 because the anticipated cost of transmission over the carrier network 107 (e.g., the cost parameter as discussed in FIG. 4) may not satisfy the high cost requirement of the routine monitoring data. In addition, because this type of data is associated with a low latency requirement, the transmission strategy 520 enables cost-effective transmission of data to the temporary cache 128, which may store the data until the anticipated cost to transmit the data over the carrier network 107 is reduced to support the cost requirements of the data. As described above with respect to FIG. 4, deferral of the transmission over the carrier network 107 can be for a fixed time period (e.g., six hours), or for a variable time period until certain conditions associated with current status of the carrier network 107 is identified (e.g., until a particular available bandwidth is available on the carrier network 107). For example, the transmission strategy 520 may specify instructions to store the routine monitoring data in the temporary cache 128 for six hours until when the bandwidth and the anticipated cost of transmission over the carrier network 107 has decreased to satisfy the cost requirements associated with the routine monitoring days.

FIG. 6 illustrates an example of transmission strategies within a repository 600. The transmission repository 600 may include a column 610 that specifies transmission requirements associated with different types of monitoring system data, a column 620 that specifies network performance parameters associated with the carrier network 107, and a column 630 that specifies a transmission strategy based on the transmission requirements and network performance parameters within a corresponding row.

In general, the monitor control unit 110 may access information stored within the transmission repository 600 in order to select a suitable transmission pathway as described above with respect to step 460 in FIG. 4. For example, after determining the transmission requirements associated with a type of monitoring system data in step 420, and computing network performance parameters for the carrier network in step 440, the monitor control unit 110 may then parse individual records within the repository 600 to identify a record for a transmission strategy that includes matching or similar transmission requirements and network performance parameters for the carrier network 107. In this regard, the monitor control unit 110 may use the repository 600 as a dynamic rule engine to select transmission strategies based on present transmission requirements (e.g., the transmission requirements determined in step 420), and a set of current network conditions of the carrier network 107 (e.g., the network parameters computed in step 440).

Referring to rows included within the repository 600, a row 635 includes a transmission strategy that prioritizes the speed of data transmission over the carrier network regardless of the associated cost of transmission. This type of transmission strategy can be used for the transmission of alarm signal data (e.g., as described in FIG. 5) where the transmission requirements specify a life-critical urgency and a low file size for notifications to be sent to the application server. For example, the monitor control unit 110 may select the transmission strategy of row 635 if monitoring system data indicates that there may be a fire in the property.

Row 640 includes a transmission strategy that considers both transmission latency and anticipated cost of transmission but specifies immediate transmission over the carrier network. This type of transmission strategy can be used for the transmission of security data that has a high, but not life-critical, urgency if the costs of transmission are appropriate. This transmission strategy can also be used to distinguish between transmitting high urgency data and delaying to transmit lower urgency data whose cost of transmission may be prohibitively expensive given its urgency. For example, security data with a high urgency is designated to be transmitted over the carrier network 107, but HVAC data with a medium urgency is not due to the lower urgency not sufficiently justifying the associated cost. In this example, each of the data types can have the same associated cost because they both involve large file sizes. In addition, this transmissions strategy may be used when the current condition of the carrier network 105 indicates a low network cost and a low network latency.

Row 645 includes a transmission strategy that prioritizes cost over latency by specifying that all data transmissions over the carrier network 107 should be delayed until the cost of transmission is lower. This type of transmission strategy can be used when the current network conditions of the carrier network 107 indicates a high network cost but a low network latency, and transmission requirements for the data to be transmitted have medium or low urgency and a large file size. Thus in this example, the monitor control unit 110 prioritizes the cost of transmission since urgency is not high and because the current network conditions do not provide for a way in which the data can be transmitted in a cost-efficient manner. When the monitor control unit 110 applies this transmission strategy, the monitor control unit may perform subsequent network performance tests on the carrier network 107 to identify changes to the network conditions to determine if the anticipated cost of transmission has decreased since conducting the initial network performance tests. In this way, the monitor control unit 110 may determine if a lowered network cost satisfies the cost requirement of the monitoring system data, and in response to determining that it does, transmit the monitoring system data over the carrier network 107 at a subsequent time period.

Row 650 specifies a similar transmission strategy to the transmission strategy included in row 645 except that it prioritize latency over network cost. In this example, the monitor control unit 110 determines that the present network conditions of the carrier network 107 indicates a low anticipated cost of transmission but a high latency. In addition, because the transmission requirements specify a low urgency for all monitoring system data and a medium file size, the monitor control unit 110 may determine that the transmission over the carrier network 107 is not justified to incur additional costs. In this example, the monitor control unit 110 may instead use this transmission strategy to alternatively transmit the monitoring system data over the local network 105 to a temporary cache, which although may not result in an immediate transmission, results in a deferred transmission when the anticipated cost of transmission over the carrier network 105 is lower.

Row 655 specifies a similar transmission strategy to the transmissions strategy included in row 645 except that it provides a fixed time period for delaying the transmission. As with the transmission strategy included in row 645, this transmission strategy prioritizes cost over latency based on the monitoring system data having a medium urgency for all data. In this example, however, the file size of the data to be transmitted is small and the anticipated cost of transmission is therefore lower than that of the anticipated cost of transmission specified in row 645. Thus, instead of indefinitely delaying the transmission of the monitoring system data, the transmission strategy instead specifies a fixed time period for delaying based on an estimation that after the fixed time period has passed the anticipated cost of transmission will be low enough to satisfy the cost requirement of the monitoring system data. In this example, the monitor control unit 110 may select the transmission strategy included in row 655 over the transmission strategy included in row 645 because either the cost requirement of the monitoring system is lower, or that the network performance of the carrier network 107 is more predictable.

Row 660 specifies a transmission strategy that modifies the monitoring system data in order to reduce the transmission requirements such that the current network performance parameters satisfy the adjusted transmission requirements. This type of transmission strategy may be used when the monitoring system data to be transmitted include large volumes of data that can be filtered and/or compressed in order to reduce the cost requirement. For example, the monitoring system data may include twenty-four-hour security footage data over the span of six days. However, because only portions of the collected raw footage may include valuable data, the monitor control unit 110 may reduce the file size by either extracted footage from certain time periods (e.g., 11 PM to 4 AM) or footage from certain days in order to reduce the overall file size. The modified security footage data includes a smaller file size, which then is associated with a smaller cost requirement that can then be satisfied by the cost parameter of the carrier network 107.

In some implementations, the repository 600 may be periodically updated over time to include and/or remove individual rows including specific transmission strategies. For example, rows that specify transmission strategies that are either outdated or have previously been determined to be unsuccessful may be discarded from the repository 600 so that the monitor control unit 110 can dynamically adjust the transmission strategy selection process. In some instances, rows including customized transmission strategies (e.g., customized based on user input) can also be added to the repository 600 in order to enable the monitor control unit 110 to transmit specific types of monitoring system data in accordance with a user's preferences. For example, as described more particularly in FIG. 7, a user may provide user inputs indicating that all security data should be handled with a high latency requirement. In response, a new row that includes a reference to security data and the applicable transmission strategy can be added to the repository 600 so that any time the monitor control unit 110 encounters a portion of security data, the selected transmission strategy is performed according to the user's preferences.

Figure 7:
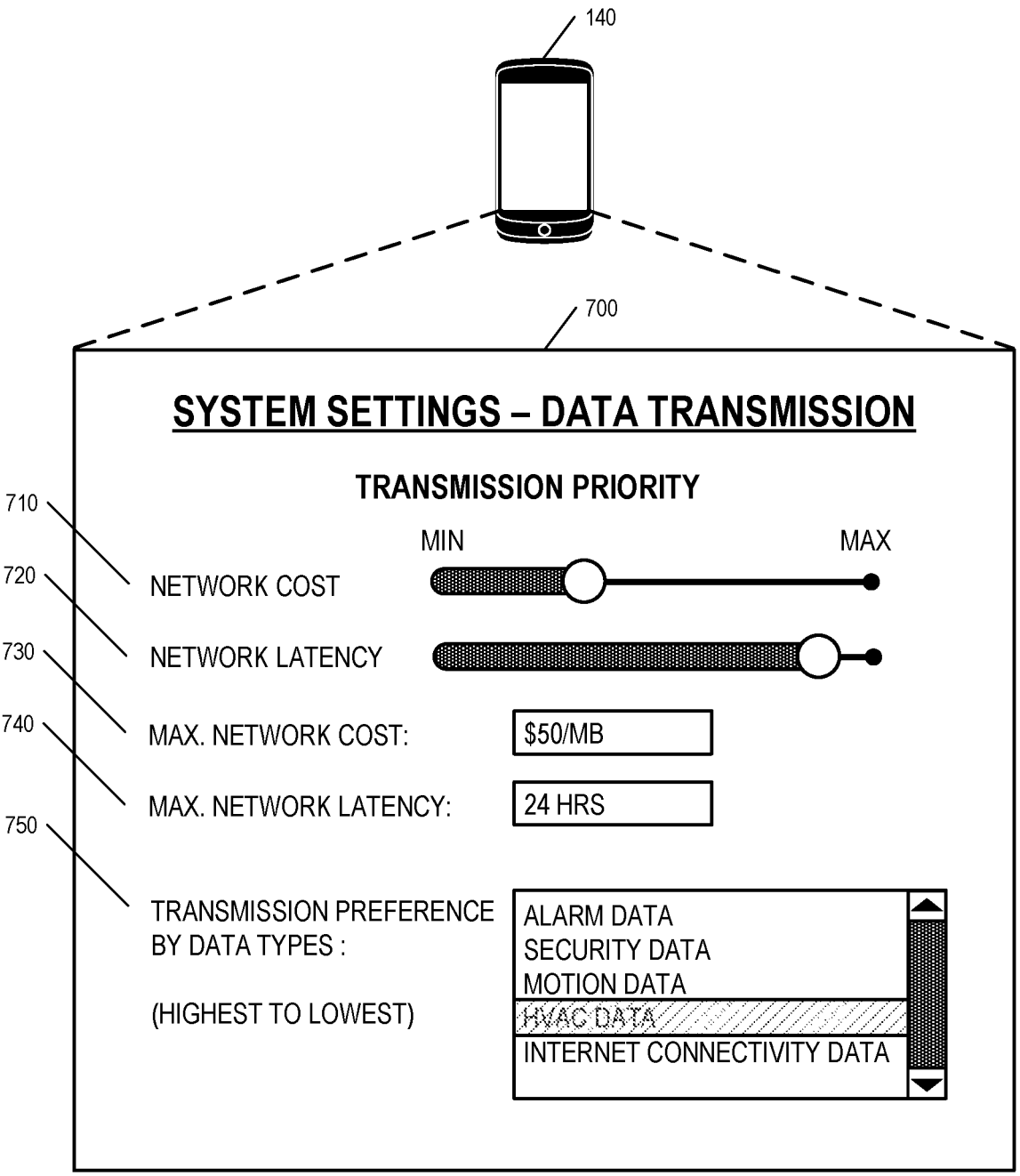
FIG. 7 illustrates an example of a user interface for customizing transmission strategies.

FIG. 7 illustrates an example of a user interface for customizing transmission strategies. The user interface 700 may be presented on a user either through a mobile application installed on the client device 140 associated with the user, or through a webpage accessed through a network browser by the user. The interface 700 generally allows the user to provide selections relating to data transmissions processed by the system 100 such that the monitor control unit 110 can transmit monitoring system data in accordance with the user selections.

The user may use sliding elements 710 and 720 to specify respective priorities for network cost and network latency. For example, because the system may process the user inputs provided on the sliding elements 710 and 720 in order to generate transmission strategies that prioritize anticipated cost and latency of transmission of transmission over the carrier network 107 based on the user's input. As an example, if a user specifies a maximum priority for network cost and a minimum priority for network latency, then the monitor control unit 110 may always proceed to select transmission strategies that only evaluate the cost parameter of the carrier network 107 in relation to the cost requirement for the monitoring system data to be transmitted. In this example, because the user indicates a minimal priority for network latency, the latency parameter for the carrier network 107 may be evaluated less often compared to the network requirements compared to the latency parameter. In another example, if the user specifies a medium priority in both sliding elements 710 and 720, then the frequency by which the monitor control unit selects transmission strategies that prioritize the network cost over the network latency and other transmission strategies that prioritize the network latency over the network latency may be equal.

The user may also provide maximum tolerances for both network cost and network latency in text boxes 730 and 740, respectively. For example, a user may specify the maximum cost that he/she would like to pay for any type of data transmission over the carrier network 107. In response, the transmission strategies used by the monitor control unit may be adjusted such that the specified value is used as the maximal network cost for the carrier network 107. Thus, if any monitoring system data has a cost requirement that exceeds the value of the maximum network cost, then the monitor control unit 110 will always select a transmission strategy that does not transmit the monitoring system data over the carrier network 107. In a similar way, the maximum network latency can be used to select transmission strategies that specify a deferral time period that is less than the specified maximum network latency.

The user may also provide input in an ordered list 750 to specify priority by which the monitor control unit 110 should transmit each type of monitoring system data. In the example depicted, the user specifies that alarm data should be handled with the greatest priority, followed by security data, motion data, HVAC data and finally, internet connectivity data. This priority list can then be used by the monitor control unit 110 to determine which portions of the monitoring system data to transmit first over the carrier network 107 during times of limited network bandwidth, and/or high cost of transmission for transmitting all of the monitoring system data. As an example, the monitor control unit may obtain alarm data and security data during the same monitoring period. Upon performing the network performance tests on the carrier network 107, the monitor control unit 110 then determines that, while the current network conditions satisfy the individual transmission requirements of each data type, only one of the alarm data and the security data may be presently transmitted over the carrier network 107 due to limited available bandwidth. In this example, the monitor control unit would transmit the alarm data and not the security data because the user input on the list 750 indicates a higher priority for alarm data compared to security data.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed application-specific integrated circuits (ASICs).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, some implementations are within the scope of the disclosure.

What is claimed is:

1. A computer-implemented method comprising:
   obtaining, by a computing device, data indicating (i) one or more performance parameters computed for a carrier network and (ii) sensor data collected by a monitoring system located in a property;
   determining, by the computing device, that the sensor data identifies presence of an alarm condition within the property;
   determining, by the computing device, a current status for the carrier network during a specified time period based on the one or more performance parameters;
   determining, by the computing device, a dynamic threshold latency for the carrier network during the specified time period based on the current status for the carrier network during the specified time period;
   determining, by the computing device, a latency associated with transmitting the sensor data over the carrier network during the specified time period; and
   determining, by the computing device, whether to transmit the sensor data over the carrier network during the specified time period, wherein the determination comprises:
      determining that the latency does not satisfy the dynamic threshold latency, and
      determining to transmit the sensor data over the carrier network during the specified time period based on the sensor data being determined to identify the presence of the alarm condition within the property and the latency being determined to not satisfy the dynamic threshold latency.

2. The method of claim 1, wherein determining the dynamic threshold latency for the carrier network during the specified time period comprises:

performing one or more network performance tests on the carrier network during the specified time period;
computing one or more network performance parameters based on results of the one or more network performance tests; and
determining the dynamic threshold latency for the carrier network during the specified time period based on the one or more network performance parameters.

3. The method of claim 2, wherein the one or more network performance parameters comprises a maximum size for transmitting data over the carrier network during the specified time period.

4. The method of claim 1, wherein determining the dynamic threshold latency for the carrier network during the specified time period comprises:
determining a data type of the sensor data collected by the monitoring system; and
determining the dynamic threshold latency for the carrier network based on the data type of the sensor data collected by the monitoring system.

5. The method of claim 1, further comprising:
determining that the sensor data collected by the monitoring system is identified as being critical for transmission; and
adjusting the dynamic threshold latency for the carrier network during the specified time period based on determining that the sensor data collected by the monitoring system is identified as being critical for transmission.

6. The method of claim 1, wherein determining the dynamic threshold latency for the carrier network during the specified time period comprises:
determining a data type of the sensor data collected by the monitoring system; and
determining the dynamic threshold latency for the carrier network based on the data type of the sensor data collected by the monitoring system.

7. A system comprising:
one or more computers; and
one or more storage devices storing instructions that, when executed by the one or more computers, cause the one or more computers to perform operations comprising:
obtaining, by a computing device, data indicating (i) one or more performance parameters computed for a carrier network and (ii) sensor data collected by a monitoring system located in a property;
determining, by the computing device, that the sensor data identifies presence of an alarm condition within the property;
determining, by the computing device, a current status for the carrier network during a specified time period based on the one or more performance parameters;
determining, by the computing device, a dynamic threshold latency for the carrier network during the specified time period based on the current status for the carrier network during the specified time period;
determining, by the computing device, a latency associated with transmitting the sensor data over the carrier network during the specified time period; and
determining, by the computing device, whether to transmit the sensor data over the carrier network during the specified time period, wherein the determination comprises:
determining that the latency does not satisfy the dynamic threshold latency, and
determining to transmit the sensor data over the carrier network during the specified time period based on the sensor data being determined to identify the presence of the alarm condition within the property and the latency being determined to not satisfy the dynamic threshold latency.

8. The system of claim 7, wherein determining the dynamic threshold latency for the carrier network during the specified time period comprises:
performing one or more network performance tests on the carrier network during the specified time period;
computing one or more network performance parameters based on results of the one or more network performance tests; and
determining the dynamic threshold latency for the carrier network during the specified time period based on the one or more network performance parameters.

9. The system of claim 7, wherein determining the dynamic threshold latency for the carrier network during the specified time period comprises:
determining a data type of the sensor data collected by the monitoring system; and
determining the dynamic threshold latency for the carrier network based on the data type of the sensor data collected by the monitoring system.

10. The system of claim 7, wherein the operations further comprise:
determining that the sensor data collected by the monitoring system is identified as being critical for transmission; and
adjusting the dynamic threshold latency for the carrier network during the specified time period based on determining that the sensor data collected by the monitoring system is identified as being critical for transmission.

11. A computer-implemented method comprising:
obtaining, by a computing device, data indicating (i) one or more performance parameters computed for a carrier network and (ii) sensor data collected by a monitoring system located in a property;
determining, by the computing device, that the sensor data identifies routine monitoring data collected within the property;
determining, by the computing device, a current status for the carrier network during a specified time period based on the one or more performance parameters;
determining, by the computing device, a dynamic threshold latency for the carrier network during the specified time period based on the current status for the carrier network during the specified time period;
determining, by the computing device, a latency associated with transmitting the sensor data over the carrier network during the specified time period; and
determining, by the computing device, whether to transmit the sensor data over the carrier network during the specified time period, wherein the determination comprises:
determining that the latency does not satisfy the dynamic threshold latency, and
determining, by the computing device, to withhold transmission of the sensor data over the carrier network during the specified time period based on the sensor data being determined to identify routine monitoring data collected within the property and the latency being determined to not satisfy the dynamic threshold latency.

12. The method of claim 11, wherein determining whether to transmit the sensor data over the carrier network during the specified time period comprises:
- determining that the latency associated with transmitting the sensor data over the carrier network during the specified time period does not satisfy the dynamic threshold latency; and
- determining to withhold transmission of the sensor data over the carrier network during the specified time period based on determining that the latency associated with transmitting the sensor data over the carrier network during the specified time period does not satisfy the dynamic threshold latency.

13. The method of claim 11, wherein determining the dynamic threshold latency for the carrier network during the specified time period comprises:
- performing one or more network performance tests on the carrier network during the specified time period;
- computing one or more network performance parameters based on results of the one or more network performance tests; and
- determining the dynamic threshold latency for the carrier network during the specified time period based on the one or more network performance parameters.

14. The method of claim 11, wherein determining the dynamic threshold latency for the carrier network during the specified time period comprises:
- determining a data type of the sensor data collected by the monitoring system; and
- determining the dynamic threshold latency for the carrier network based on the data type of the sensor data collected by the monitoring system.

15. The method of claim 11, further comprising:
- determining that the sensor data collected by the monitoring system is identified as being critical for transmission; and
- adjusting the dynamic threshold latency for the carrier network during the specified time period based on determining that the sensor data collected by the monitoring system is identified as being critical for transmission.

16. A system comprising:
- one or more computers; and
- one or more storage devices storing instructions that, when executed by the one or more computers, cause the one or more computers to perform operations comprising:
  - obtaining, by a computing device, data indicating (i) one or more performance parameters computed for a carrier network and (ii) sensor data collected by a monitoring system located in a property;
  - determining, by the computing device, that the sensor data identifies routine monitoring data collected within the property;
  - determining, by the computing device, a current status for the carrier network during a specified time period based on the one or more performance parameters;
  - determining, by the computing device, a dynamic threshold latency for the carrier network during the specified time period based on the current status for the carrier network during the specified time period;
  - determining, by the computing device, a latency associated with transmitting the sensor data over the carrier network during the specified time period; and
  - determining, by the computing device, whether to transmit the sensor data over the carrier network during the specified time period, wherein the determination comprises:
    - determining that the latency does not satisfy the dynamic threshold latency, and
    - determining to withhold transmission of the sensor data over the carrier network during the specified time period based on the sensor data being determined to identify routine monitoring data collected within the property and the latency being determined to not satisfy the dynamic threshold latency.

17. The system of claim 16, wherein determining whether to transmit the sensor data over the carrier network during the specified time period comprises:
- determining that the latency associated with transmitting the sensor data over the carrier network during the specified time period does not satisfy the dynamic threshold latency; and
- determining to withhold transmission of the sensor data over the carrier network during the specified time period based on determining that the latency associated with transmitting the sensor data over the carrier network during the specified time period does not satisfy the dynamic threshold latency.

18. The system of claim 16, wherein determining the dynamic threshold latency for the carrier network during the specified time period comprises:
- performing one or more network performance tests on the carrier network during the specified time period;
- computing one or more network performance parameters based on results of the one or more network performance tests; and
- determining the dynamic threshold latency for the carrier network during the specified time period based on the one or more network performance parameters.

19. The system of claim 16, wherein determining the dynamic threshold latency for the carrier network during the specified time period comprises:
- determining a data type of the sensor data collected by the monitoring system; and
- determining the dynamic threshold latency for the carrier network based on the data type of the sensor data collected by the monitoring system.

20. The system of claim 16, wherein the operations further comprise:
- determining that the sensor data collected by the monitoring system is identified as being critical for transmission; and
- adjusting the dynamic threshold latency for the carrier network during the specified time period based on determining that the sensor data collected by the monitoring system is identified as being critical for transmission.

* * * * *